United States Patent [19]

Lawson

[11] Patent Number: 5,209,054
[45] Date of Patent: May 11, 1993

[54] MOWING DEVICE

[75] Inventor: Francis J. Lawson, Lafaivre, Canada

[73] Assignee: James E. Cummings, Sharon, Mass.

[21] Appl. No.: 673,225

[22] Filed: Mar. 21, 1991

Related U.S. Application Data

[63] Continuation-in-part of Ser. No. 516,201, Apr. 30, 1990, abandoned.

[51] Int. Cl.⁵ .................... A01D 34/13; A01D 34/14
[52] U.S. Cl. ........................ 56/300; 30/304; 30/337; 56/303
[58] Field of Search ............... 56/296, 298, 299, 300, 56/301, 303; 30/309, 335, 336, 337

[56] References Cited

U.S. PATENT DOCUMENTS

| | | |
|---|---|---|
| 97,062 | 11/1869 | Dulaney . |
| 349,311 | 12/1886 | Lease . |
| 394,441 | 12/1888 | Bennett . |
| 594,747 | 11/1897 | Landes . |
| 635,321 | 10/1899 | Hill ........................ 56/300 |
| 915,247 | 3/1909 | Sunquist . |
| 997,495 | 7/1911 | Gourley . |
| 1,137,662 | 4/1915 | Parsons . |
| 1,158,521 | 11/1915 | McElroy ................ 56/300 |
| 1,164,691 | 12/1915 | Wilson . |
| 1,214,345 | 1/1917 | Melby . |
| 1,274,659 | 8/1918 | Alexander ............... 56/298 |
| 1,315,312 | 9/1919 | Klenck ................ 30/336 X |
| 1,390,753 | 9/1921 | Bergman ................ 56/301 |
| 1,537,354 | 3/1924 | Hover . |
| 1,684,616 | 9/1927 | Bicek . |
| 2,427,306 | 9/1947 | Schafer . |
| 2,730,858 | 1/1956 | Steiner . |
| 3,013,373 | 12/1961 | Kopaska ................ 56/298 |
| 3,037,342 | 6/1962 | Boyer . |
| 3,295,300 | 1/1967 | Yeske . |
| 3,557,538 | 1/1971 | Vandewalle . |
| 4,198,803 | 4/1980 | Quick et al. . |
| 4,223,514 | 9/1980 | Halls et al. ............. 56/303 X |
| 4,646,440 | 3/1987 | Decker ................ 30/335 X |
| 5,007,484 | 4/1991 | Johanson ................ 172/1 |

FOREIGN PATENT DOCUMENTS

| | | |
|---|---|---|
| 585175 | 6/1989 | Australia . |
| 832357 | 2/1952 | Fed. Rep. of Germany ........ 56/299 |
| 2967 | of 1873 | United Kingdom .............. 56/298 |
| 20795 | of 1911 | United Kingdom . |
| 891085 | 3/1962 | United Kingdom .............. 56/299 |

Primary Examiner—George A. Suchfield
Attorney, Agent, or Firm—Hayes, Soloway, Hennessey & Hage

[57] ABSTRACT

A two-piece cutter member for mounting on a sickle bar has a rigid thin support element arranged for relatively permanent attachment to a sickle bar, and a flat planar pyramid-shaped spring metal blade. A portion of the blade provides at least one bridge or loop for encircling the support element and holding the blade on the support element. A section of either said the portion or the support element is displaced with respect to the support face to releasably hold the blade on the support when the blade is fully positioned on said support element.

30 Claims, 2 Drawing Sheets

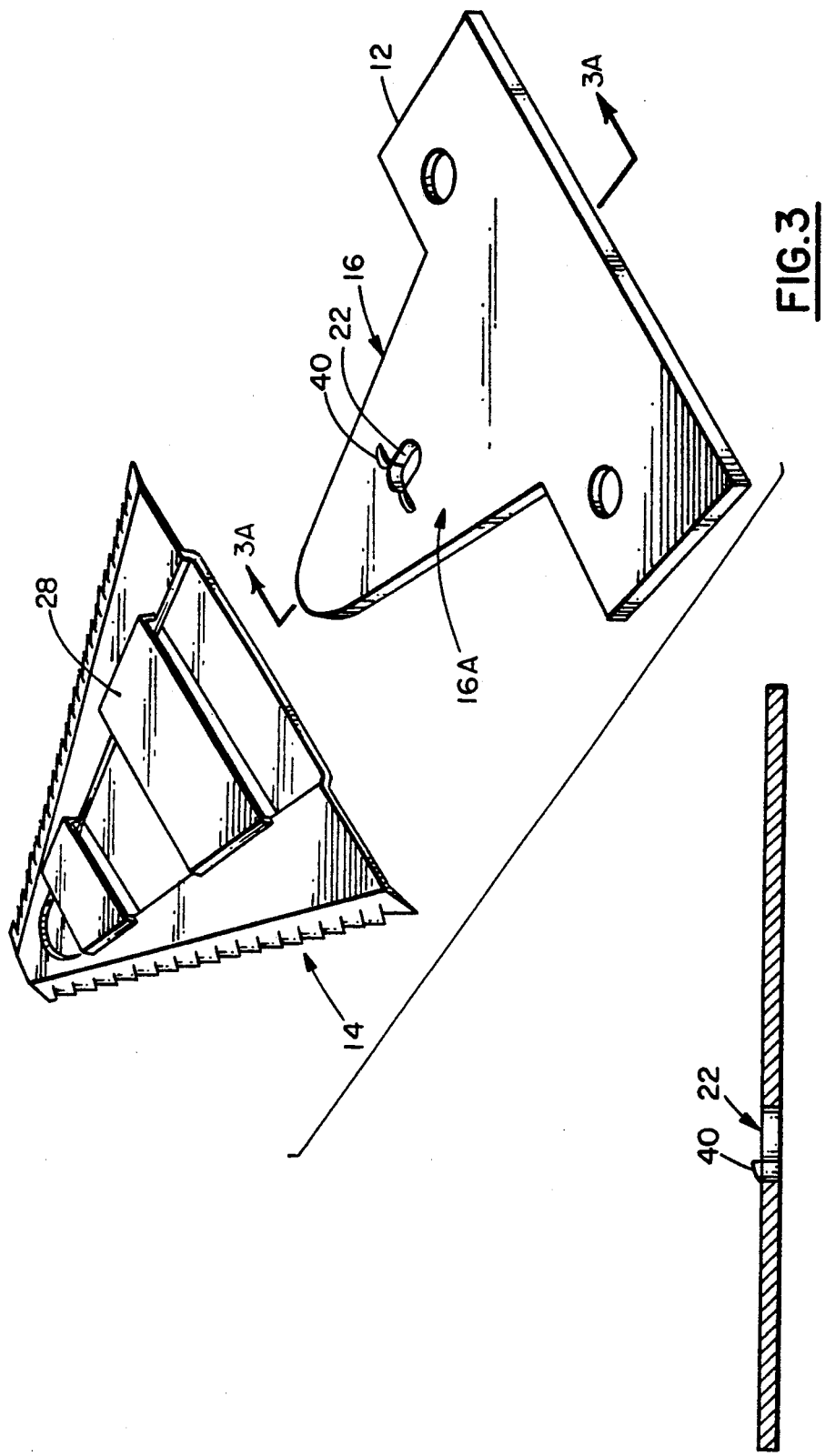

MOWING DEVICE

This application is a continuation-in-part of my co-pending application Ser. No. 07/516,201, filed Apr. 30, 1990, now abandoned.

The present invention relates to improvements in mowing devices. The invention has particular utility in connection with sickle bar cutter member for mowing machines, and more particularly to replacement cutter members for such sickle bars, and will be described in connection with such utility, although other utilities, e.g. in connection with swathers, combines and other harvesting equipments are contemplated.

BACKGROUND OF THE INVENTION

FIELD OF THE INVENTION

Replaceable cutter members have long been a standard feature of sickle bars since the cutter members are subject to damage and breakage due to use. The art is well-developed in this area and is represented by the following U.S. patents:

U.S. Pat. No. 97,062 issued Nov. 23, 1869 in the name of G.L. Du Laney; and
U.S. Pat. No. 594,747 issued Nov. 30, 1897 in the name of H. M. Landes;
U.S. Pat. No. 635,321 issued Oct. 24, 1899 in the name of J.B. Hill;
U.S. Pat. No. 915,247 issued Mar. 16, 1909 in the name of P.E. Sundquist;
U.S. Pat. No. 997,495 issued Jul. 11, 1911 in the name of W.R. Gourley;
U.S. Pat. No. 1,137,662 issued Apr. 27, 1915 in the name of B. C. Parsons;
U.S. Pat. No. 1,158,521 issued Nov. 2, 1915 in the name of J. H. McElroy;
U.S. Pat. No. 1,164,691 issued Dec. 21, 1915 in the name of T.J. Wilson;
U.S. Pat. No. 1,214,345 issued Jan. 30, 1917 in the name of B. Melby;
U.S. Pat. No. 1,274,659 issued Aug. 6, 1918 in the name of J. W. Alexander;
U.S. Pat. No. 1,315,312 issued Sep. 9, 1919 in the name of J. H. Klenck;
U.S. Pat. No. 1,537,354 issued May 12, 1925 in the name of C.F. Hover;
U.S. Pat. No. 1,684,616 issued Sep. 18, 1928 in the name of F.J. Bicek;
U.S. Pat. No. 3,013,373 issue Aug. 15, 1958 in the name of A.F. Kopaska;
U.S. Pat. No. 2,427,306 issued Sep. 9, 1947 in the name of J.F. Schafer;
U.S. Pat. No. 4,223,514 issued Sep. 23, 1980 in the name of Lawrence M. Halls and Horace G. McCarty;
U.S. Pat. No. 4,646,440 issued Mar. 3, 1987 in the name of John R. Decker;

In addition there are the following foriegn patents of interest:
British Patent Number 2967 issued Sep. 10, 1873
British Patent Number 891085 issued Jun. 22, 1959
German Patent Number 832357 issued Feb. 25, 1952

In all of these patents the whole blade must be replaced when there is any damage to the blade. This replacement involves various degrees of difficulty and expense.

BRIEF DESCRIPTION OF THE INVENTION

In the present invention there is provided a novel two-piece cutter member which can be semi-permanently mounted onto a sickle bar. The cutter member comprises a relatively rigid or semi-rigid support element having a base portion for rigid attachment to the sickle bar. The support element preferably extends from the sickle bar in the form of a pyramidal shape roughly representing the shape of a tooth of the cutter element. Carried by the rigid support element, there is a flat spring metal blade which is readily removable from the support element. The spring metal blade includes a cutting face and a support face. The spring metal blade preferably has at least one portion displaced from the plane thereof to provide at least one bridge or loop for surrounding the support element. This loop preferably includes a detent which is bent toward the plane of the blade and is positioned to engage an opening in the support element to releasably lock the spring metal cutter element onto the support element. Preferably, other portions of the spring metal blade are also displaced from the plane thereof to stiffen the blade and engage the edges of the support element to provide transmittal of cutting forces from the flat spring metal blade to the support element.

DETAILED DESCRIPTION OF THE INVENTION

In order to more fully understand the invention, reference should be had to the following detailed description taken in connection with the following drawings wherein:

FIG. 3 is an exploded schematic view of another preferred embodiment of the invention.

FIG. 3a is an enlarged section view of a portion of FIG. 3 along the line A—A.

Figure 1:
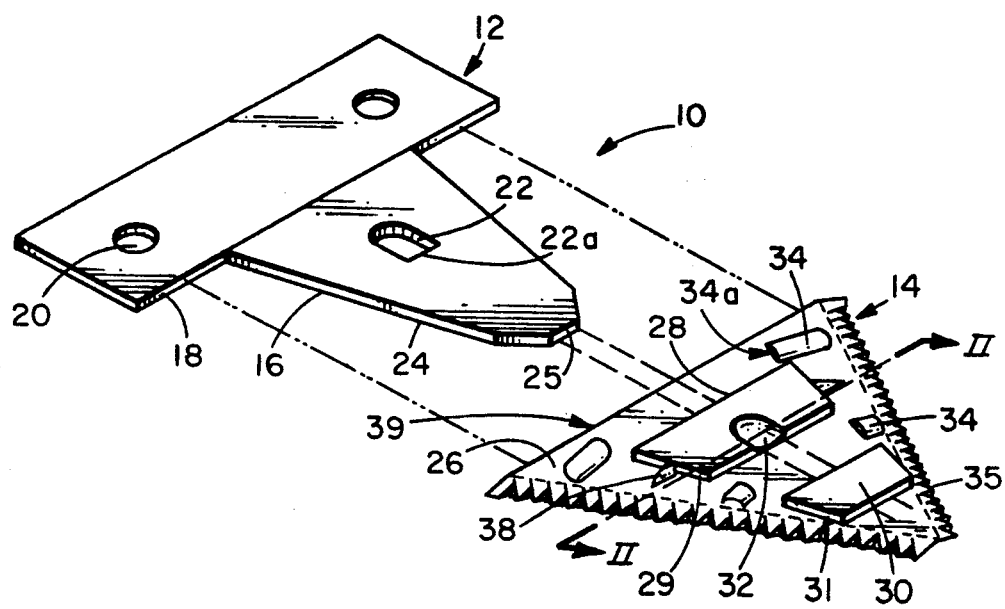
FIG. 1 is an exploded schematic view of the two-piece cutter member.
Figure 2:
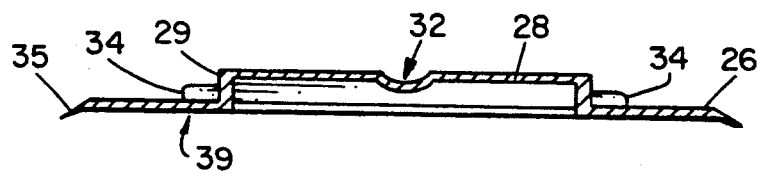
FIG. 2 is a partial schematic cross-sectional view of the blade taken along the line II—II of FIG. 1.

Referring now to FIGS. 1 and 2, the two-piece cutter member, generally indicated at 10, comprises the relatively rigid support element 12 and the flat spring metal blade 14 carried thereby. The support element, which preferably is formed of a spring steel, comprises a rigid support member 16 which preferably is of a roughly pyramidal shape which extends from the front edge of base member 18. The support element 12 is adapted to be secured, more or less permanently, to the sickle bar by fastening means such as bolt holes 20. An opening 22 is provided in the rigid support member portion 16. Sloping walls faces 24 terminate at an end 25 of the rigid support member.

The flat spring metal blade, generally indicated at 14, comprises a thin sheet, e.g. 0.005–0.030 inch thick spring steel shown at 26 as having offset portions 28 and 30 forming a loop therefrom. These portions are offset by at least the thickness of the rigid support member 16 to permit these offset portions to be slipped over the end 25 of the rigid support member 16.

The flat spring metal blade includes a cutting face 35, a support face 39 to receive the rigid support member, and a planar face 26. Formed on the planar face are offset portions 28 and 30 and reinforcing ribs 34 and 38.

Detent 32 formed in the lower loop 28, essentially extends across the loop opening. Reinforcing ribs 34 and 38 may be provided along the edges of the planar part of the blade inside of the area including the teeth 35. The vertical walls 29 and 31, respectively of loops 28 and 31, run parallel to edge 24 of the rigid support member 16. The same is true of the interior edges 34a of the ribs 34.

In view of the above construction, when the spring metal blade 14 is slipped over rigid support member 16, it will slide down until detent 32 enters the hole 22. At this point, all of the vertical walls 29, 31 and 34A engage the edge 24 of the rigid support member 16 and the rear edge of detent 32 will engage the transverse wall 22A of the hole 22 and lock the spring metal blade in position. The reinforcing ribs 38 adjacent to each of the walls 29 and 31 add additional rigidity to the structure. When the blade is thus rigidly mounted onto the rigid support member 16 the cutting forces are transmitted through the relatively thin, but reinforced, spring metal sheet from the cutting edge 35 to the rigid support element 12. When the spring metal blade 14 is damaged or dulled it can be easily removed by pushing on the detent 32 to release it from the edge 22A permitting easy removal of the whole spring metal blade 14 therefrom for repair or replacement. Thus a very lightweight blade is provided which is of much less cost than a blade formed of a single rigid piece having sufficient mass to absorb the cutting forces.

In a preferred form of the invention, the support element is made of heat treated and tempered spring steel 0.060 inch thick and the steel blade is made of heat treated and tempered spring steel 0.015 inch thick. As will be noticed, the cutting edge 35 is bent downwardly away from the cutting face so that the cutting edge can be held in tight spring-like engagement with the stationary bar of the cutter, thus providing efficient cutting action.

In another preferred embodiment of the invention, the means for holding the replaceable blade on the rigid support comprises a ridge 40 on the support element as illustrated in FIGS. 3 and 3a. This ridge 40 is formed by upsetting a portion of the upper surface 16a on the support 16 adjacent hole 22. In this embodiment of the invention, the loop 28 is not deformed at 32 as in FIG. 1. When the loop 28 passes over the ridge 40 it bends outwardly and then snaps in position behind the ridge 40 to hold the blade 14 firmly on the support.

Since the ridge 40 is along side the hole 22 (see FIG. 3a), a tool may be inserted into hole 22 and under the edge of loop 28 to lift this edge over the ridge 40 when the blade 14 is to be removed for sharpening or replacement. If desired, hole 22 may be replaced by a groove.

Various changes may be made in the invention without departing from the spirit and scope thereof. For example, cutting edge 35 may be serrated as shown in the drawings, or the cutting edge may take on a variety of geometries depending on the intended use. Still other changes may be made by one skilled in the art from the foregoing specification.

I claim:

1. A two-piece cutter member for mounting on a sickle bar comprising a rigid thin support element arranged for relatively permanent attachment to a sickle bar, a flat planar pyramid-shaped spring metal blade having a cutting face and a support face, a portion of the blade being displaced away from the support face to provide at least one loop for encircling said support element and holding said blade onto said support element, an opening in said support element, a portion of said one loop being bent toward the plane of the blade and positioned to engage said opening in the support element to releasably hold said blade on said support when said blade is fully positioned on said support element, other portions of said blade being displaced from the plane of the blade to engage edges of the support element to resist sideways displacement of the blade during use.

2. A cutter member of claim 1 wherein the support element is of a pyramid shape.

3. A cutter member of claim 1 wherein at least two loops are formed from the blade.

4. A cutter member of claim 1 wherein the blade has cutting edges which are bent away from the plane of the support element to permit spring loading of said cutting edges against a stationary bar.

5. A cutter member of claim 4, wherein said cutting edges are serrated.

6. A cutter member of claim 1, wherein said support element comprises a base unit and a rigid support member extending therefrom.

7. A cutter member of claim 6, wherein said support member is of a pyramid shape.

8. A cutter member of claim 7, wherein said base unit includes a plurality of holes to fasten the sickle bar.

9. A cutter member of claim 1, further comprising means for reinforcing said loops, said reinforcing means being placed adjacent to said loops, adding additional rigidity to the cutter member.

10. A cutter member of claim 9, wherein said reinforcing means are aligned parallel with the edges of said support element.

11. A cutter member of claim 10, wherein cutting forces are transmitted from the cutting edges to said support element.

12. A two-piece cutting device for mounting on a sickle bar, comprising a rigid, thin support element arranged for relatively permanent attachment to the sickle bar; a flat, planar metal blade having a cutting face and a support face wherein the cutting face is displaced away from the support face, said blade having at least one loop portion for encircling said support element and holding said blade on said support element, said loop portion being bent toward the plane of the blade and positioned to engage said support element to releasably hold said blade on said support element when said blade is fully positioned on said support element.

13. A cutting device of claim 12, wherein said support element comprises a base unit and a rigid support member extending therefrom, said base unit having a plurality of holes to fasten the sickle bar, and said rigid support member having an opening therein to receive said loop portion.

14. A cutting device of claim 12, wherein said support member is of a pyramid shape.

15. A cutting device of claim 12, wherein the cutting face has edges bent away from the support element to permit loading.

16. A cutting device of claim 12, further comprising means for reinforcing said loop portion, said reinforcing means being placed adjacent to said loop portion, adding additional rigidity to the cutting device.

17. A cutting device of claim 16, wherein said reinforcing means are aligned parallel with the edges of said support element.

18. A cutting device of claim 12, wherein cutting forces are transmitted from the cutting edges to said support element.

19. A two-piece cutting device for mounting on a sickle bar, comprising a rigid, thin support element arranged for relatively permanent attachment to the sickle bar; a flat, generally planar metal blade having a support face for engaging the support element and an opposite face, and wherein the opposite face is displaced away from the support face, said blade having at least one loop portion for encircling said support element and holding said blade on said support element, a section of either said loop portion or said support element being displaced with respect to the support face to releasably hold said blade on said support element when said blade is fully positioned on said support element.

20. The cutting device of claim 19 wherein said support element includes a ridge for engaging a front edge of said loop portion.

21. The cutting device of claim 20 wherein said support element includes a groove adjacent said ridge.

22. The cutting device of claim 21, wherein said groove extends through the support elements.

23. A triangular shaped blade element for mounting on a relatively rigid flat triangular support element attached to a sickle bar, said blade element being formed of a spring metal sheet and having at least one loop portion for encircling said support element, said loop portion being flexible so as to move away from contact with said support element as it is slid on said support element and reaches a point where a section of either said loop portion or said support element is displaced with respect to the area of contact between the loop portion and the support element, said flexible loop portion returning to its original shape when the blade is fully seated and the displaced portion acts to releasably hold the blade on the support element.

24. The blade element of claim 23 wherein said loop portion is bent towards the plane of the blade and is positioned to engage a hole in the support element.

25. The blade element of claim 23 wherein the loop portion is sufficiently flexible to pass over a ridge having a rear shoulder for engaging a front edge of the loop portion.

26. A blade element of claim 23 wherein at least two loops are formed from the blade.

27. A blade element of claim 23 wherein the blade element has cutting edges which are bent away from the plane of the support element when the blade element is fully seated on the support element to permit spring loading of said cutting edges against a stationary bar.

28. A blade element of claim 27, wherein said cutting edges are serrated.

29. A blade element of claim 23, further comprising means for reinforcing said at least one loop portion, said reinforcing means being placed adjacent to said at least one loop portion.

30. A blade element of claim 29, wherein said reinforcing means are aligned parallel with the edges of said support element when the blade is fully seated on the support element.

* * * * *